(12) United States Patent
Pugh et al.

(10) Patent No.: US 8,589,190 B1
(45) Date of Patent: Nov. 19, 2013

(54) SYSTEM AND METHOD FOR UNDERWRITING A PREPACKAGED BUSINESS OWNERS INSURANCE POLICY

(75) Inventors: Todd Pugh, Bothell, WA (US); Brian Ruddy, Bothell, WA (US)

(73) Assignee: Liberty Mutual Insurance Company

( * ) Notice: Subject to any disclaimer, the term of this patent is extended or adjusted under 35 U.S.C. 154(b) by 1210 days.

(21) Appl. No.: 11/867,865

(22) Filed: Oct. 5, 2007

Related U.S. Application Data

(60) Provisional application No. 60/828,593, filed on Oct. 6, 2006.

(51) Int. Cl.
*G06Q 40/00* (2012.01)

(52) U.S. Cl.
USPC .................................. 705/4; 705/38; 463/25

(58) Field of Classification Search
USPC ....... 705/4, 2, 36 T, 38; 463/25, 29; 235/380; 273/142 D
See application file for complete search history.

(56) References Cited

U.S. PATENT DOCUMENTS

| | | | |
|---|---|---|---|
| 4,831,526 A | 5/1989 | Luchs et al. |
| 4,876,648 A | 10/1989 | Lloyd |
| 4,975,840 A | 12/1990 | DeTore et al. |
| 5,231,571 A | 7/1993 | D'Agostino |
| 5,523,942 A | 6/1996 | Tyler et al. |
| 5,673,402 A | 9/1997 | Ryan et al. |
| 5,749,081 A | 5/1998 | Whiteis |
| 5,873,066 A | 2/1999 | Underwood et al. |
| 5,970,464 A | 10/1999 | Apte et al. |
| 5,995,947 A | 11/1999 | Fraser et al. |
| 6,012,044 A | 1/2000 | Maggioncalda et al. |
| 6,012,047 A | 1/2000 | Mazonas et al. |
| 6,021,403 A | 2/2000 | Horvitz et al. |
| 6,058,369 A | 5/2000 | Rothstein |
| 6,064,970 A | 5/2000 | McMillan et al. |
| 6,088,686 A | 7/2000 | Walker et al. |
| 6,105,007 A | 8/2000 | Norris |
| 6,272,528 B1 | 8/2001 | Cullen et al. |
| 6,526,386 B1 | 2/2003 | Chapman et al. |
| 6,594,635 B1 | 7/2003 | Erlanger |

(Continued)

FOREIGN PATENT DOCUMENTS

| EP | 0 935 208 A2 | 8/1999 |
|---|---|---|
| EP | 0 935 208 A3 | 8/1999 |

(Continued)

OTHER PUBLICATIONS

Danford, David P., Online Mortgage Busines Puts Consumers in Driver's Seat, 1999, pp. 2-8, Mortgage Market Trends.

(Continued)

*Primary Examiner* — Behrang Badii
(74) *Attorney, Agent, or Firm* — Alston & Bird LLP

(57) ABSTRACT

A method, computer program product and system are provided for underwriting an insurance product such as a business owners policy by establishing a prepackaged policy having predetermined coverages, predetermined limits, and a fixed price, screening a potential customer for eligibility, and issuing the policy. The process may omit application of underwriting models to provide risk profiles and a premium based on a customer's individual data. The screening process may include comparing information from a customer to characteristics of a category of customers eligible for the insurance product, and verifying the information provided by the customer using internal carrier and external sources.

11 Claims, 4 Drawing Sheets

(56) References Cited

U.S. PATENT DOCUMENTS

| | | |
|---|---|---|
| 6,684,189 B1 | 1/2004 | Ryan et al. |
| 6,697,824 B1 | 2/2004 | Bowman-Amuah |
| 6,823,319 B1 | 11/2004 | Lynch et al. |
| 6,868,386 B1 | 3/2005 | Henderson et al. |
| 6,901,384 B2 | 5/2005 | Lynch et al. |
| 6,904,412 B1 | 6/2005 | Broadbent et al. |
| 6,938,022 B1 | 8/2005 | Singhal |
| 6,985,886 B1 | 1/2006 | Broadbent et al. |
| 7,072,841 B1 | 7/2006 | Pednault |
| 7,085,735 B1 | 8/2006 | Hall et al. |
| 7,181,427 B1 | 2/2007 | DeFrancesco et al. |
| 7,240,017 B2 | 7/2007 | Labelle et al. |
| 7,277,861 B1 | 10/2007 | Benson et al. |
| 7,386,463 B2 | 6/2008 | McCabe |
| 7,610,210 B2 | 10/2009 | Helitzer et al. |
| 7,711,584 B2 | 5/2010 | Helitzer et al. |
| 2001/0005829 A1 | 6/2001 | Raveis, Jr. |
| 2001/0047327 A1 | 11/2001 | Courtney |
| 2002/0002475 A1 | 1/2002 | Freedman et al. |
| 2002/0023051 A1 | 2/2002 | Kunzle et al. |
| 2002/0026478 A1 | 2/2002 | Rodgers et al. |
| 2002/0029188 A1 | 3/2002 | Schmid |
| 2002/0035488 A1 | 3/2002 | Aquila et al. |
| 2002/0038363 A1 | 3/2002 | MacLean |
| 2002/0040312 A1 | 4/2002 | Dhar et al. |
| 2002/0052835 A1 | 5/2002 | Toscano |
| 2002/0059137 A1 | 5/2002 | Freeman et al. |
| 2002/0082860 A1 | 6/2002 | Johnson |
| 2002/0111835 A1 | 8/2002 | Hele et al. |
| 2002/0116228 A1 | 8/2002 | Bauer et al. |
| 2002/0116231 A1 | 8/2002 | Hele et al. |
| 2002/0120474 A1 | 8/2002 | Hele et al. |
| 2002/0128882 A1 | 9/2002 | Nakagawa et al. |
| 2002/0138413 A1 | 9/2002 | Creamer et al. |
| 2002/0143680 A1 | 10/2002 | Walters et al. |
| 2002/0147613 A1 | 10/2002 | Kennard et al. |
| 2002/0194033 A1 | 12/2002 | Huff |
| 2003/0036994 A1 | 2/2003 | Witzig et al. |
| 2003/0036996 A1 | 2/2003 | Lazerson |
| 2003/0055778 A1 | 3/2003 | Erlanger |
| 2003/0093302 A1 | 5/2003 | Quido et al. |
| 2003/0125990 A1 | 7/2003 | Rudy et al. |
| 2003/0149658 A1 | 8/2003 | Rossbach et al. |
| 2003/0158758 A1* | 8/2003 | Kanazawa et al. ............ 705/4 |
| 2003/0167191 A1* | 9/2003 | Slabonik et al. ............ 705/4 |
| 2003/0171959 A1 | 9/2003 | Galloway |
| 2003/0172025 A1 | 9/2003 | Gallina |
| 2003/0200125 A1 | 10/2003 | Erlanger |
| 2003/0216965 A1 | 11/2003 | Libman |
| 2003/0229522 A1 | 12/2003 | Thompson et al. |
| 2003/0229581 A1 | 12/2003 | Green et al. |
| 2003/0233316 A1 | 12/2003 | Hu et al. |
| 2004/0002915 A1 | 1/2004 | McDonald et al. |
| 2004/0006521 A1 | 1/2004 | Diamant et al. |
| 2004/0019508 A1 | 1/2004 | Yaruss et al. |
| 2004/0019517 A1 | 1/2004 | Sennott |
| 2004/0019558 A1 | 1/2004 | McDonald et al. |
| 2004/0049450 A1 | 3/2004 | Lussier |
| 2004/0059653 A1 | 3/2004 | Verkuylen et al. |
| 2004/0064402 A1 | 4/2004 | Dreyer et al. |
| 2004/0083164 A1 | 4/2004 | Schwartz et al. |
| 2004/0117216 A1 | 6/2004 | Dutta et al. |
| 2004/0128170 A1 | 7/2004 | MacKethan et al. |
| 2004/0128172 A1 | 7/2004 | Van Cleave et al. |
| 2004/0128233 A1 | 7/2004 | Jarzmik |
| 2004/0153362 A1 | 8/2004 | Bauer et al. |
| 2004/0167798 A1 | 8/2004 | Hastings |
| 2004/0172304 A1 | 9/2004 | Joao |
| 2004/0177029 A1 | 9/2004 | Hammour et al. |
| 2004/0215552 A1 | 10/2004 | Horn et al. |
| 2005/0010423 A1 | 1/2005 | Bagbey et al. |
| 2005/0102171 A1* | 5/2005 | Ashley et al. ............ 705/4 |
| 2005/0108062 A1 | 5/2005 | Higgins |
| 2005/0114173 A1* | 5/2005 | Harris ............ 705/2 |
| 2005/0177490 A1 | 8/2005 | Pembroke |
| 2005/0240444 A1 | 10/2005 | Wooten et al. |
| 2005/0240451 A1 | 10/2005 | Johnson et al. |
| 2005/0289046 A1 | 12/2005 | Conyack, Jr. |
| 2006/0031159 A1 | 2/2006 | Minot et al. |
| 2006/0033625 A1 | 2/2006 | Johnson et al. |
| 2006/0036473 A1 | 2/2006 | Taylor |
| 2006/0053038 A1 | 3/2006 | Warren et al. |
| 2006/0136274 A1 | 6/2006 | Olivier et al. |
| 2006/0161462 A1 | 7/2006 | Sharma |
| 2006/0212195 A1 | 9/2006 | Veith et al. |
| 2006/0218014 A1 | 9/2006 | Walker et al. |
| 2006/0253305 A1 | 11/2006 | Dougherty |
| 2006/0271465 A1 | 11/2006 | McNamar et al. |
| 2007/0016542 A1 | 1/2007 | Rosauer et al. |
| 2007/0021987 A1 | 1/2007 | Binns et al. |
| 2007/0038485 A1 | 2/2007 | Yeransian et al. |
| 2007/0038488 A1 | 2/2007 | Bauer et al. |
| 2007/0174096 A1* | 7/2007 | Cain et al. ............ 705/4 |
| 2007/0174179 A1 | 7/2007 | Avery |
| 2007/0226014 A1* | 9/2007 | Alemayehu et al. ............ 705/4 |
| 2008/0027764 A1 | 1/2008 | Marturana et al. |
| 2008/0065426 A1 | 3/2008 | Ziade et al. |
| 2008/0126128 A1* | 5/2008 | Markman ............ 705/2 |
| 2008/0154651 A1 | 6/2008 | Kenefick et al. |
| 2009/0048877 A1 | 2/2009 | Binns et al. |
| 2009/0119133 A1 | 5/2009 | Yeransian et al. |
| 2009/0177501 A1 | 7/2009 | Grover et al. |
| 2009/0265190 A1* | 10/2009 | Ashley et al. ............ 705/4 |
| 2010/0004957 A1 | 1/2010 | Ball |

FOREIGN PATENT DOCUMENTS

| | | |
|---|---|---|
| WO | WO 99/48036 | 9/1999 |
| WO | WO 01/91017 A1 | 11/2001 |
| WO | WO 02/088889 A2 | 11/2002 |

OTHER PUBLICATIONS

Straka, John W., A Shift in the Mortgage Landscape: The 1990's Move to Automated Credit Evaluations, Journal of Housing Research, 2000, pp. 207-232, vol. 11, Issue 2, Fannie Mae Foundation.

Simon Field, A personalised needs oriented approach to insurance product sales, 2002, pp. 1-4, IBM Zurich Research Laboratory.

Raffi Kassarjian, Banking's customer imperative: Are you building on your advantage—or losing it?, pp. 1-5, Fall 2006/Winter 2007, vol. 30, #3, View Points, Fair Isaac Corporation.

Ian Turvill, The 21$^{st}$ century insurer: Beyond price—Successful responses to shrinking opportunities, pp. 11-12, Fall 2006/Winter 2007, vol. 30, #3, View Points, Fair Isaac Corporation.

View Points, Scotiabank set to reap rewards from customer-centric collections, p. 24, Fall 2006/Winter 2007, vol. 30, #3, View Points, Fair Isaac Corporation.

Alexander Felfernig, Koba4MS: Selling Complex Products and Services using Knowledge-based Recommender Technologies, 2005, pp. 1-9, IEEE International Conference on E-Commerce Technology.

Homesite, Homeowners Product Guide for Agents, Guide, Jan. 23, 2007, 33 Pages, Version 2.1, Homesite Insurance Group Inc.

U.S. Department of Housing and Urban Development Office of Policy Development and Research, Economic Analysis and Initial Regulatory Flexibility Analysis for RESPA Proposed Rule to Simplify and Improve the Process of Obtaining Mortgages to Reduce Settlement Costs to Consumers, Jul. 2002, 100 Pages, U.S. Department of Housing and Urban Development Office of Policy Development and Research.

Ed Connor, Introducing The Final Flood Insurance Rules: Update on Lender Compliance, Watermark, Fall/Winter 1996, pp. 1, 14-15, National Flood Insurance Program.

LandAmerica Lending Services, Product Features, Mar. 13, 2007, 5 pages, LandAmerica Lender Services.

Drawing Page—Current Model, Customer Abandonment—Customer Decline Flowchart.

Acord Corporation, Acord 131 (1/96), Umbrella Section, 1991, 2 pages total, Acord Corporation.

(56) References Cited

OTHER PUBLICATIONS

Meg Green, Automated Underwriting Helps Safeco Rate Commercial Risks, vol. 106, No. 1, p. 106, May 1, 2005, Best's Review.
Amoroso, R., Secrets to Successful Commercial Segmentation, vol. 107, Issue 3, 6 pages, Jul. 1, 2006, Best's Review.
Grossman et al., Research Report, Insurance Risk Modeling Using Data Mining Technology, 10 pages, Mar. 31, 1998, IBM Research Division, IBM T.J. Watson Research Center.
Etti Baranoff, Risk Management and Insurance, Book, 2004, 11 pages total, John Wiley & Sons, Inc.
Office Action from Corresponding U.S. Appl. No. 11/617,395 dated Jan. 26, 2010.
Office Action from Corresponding U.S. Appl. No. 11/617,395 dated Jun. 22, 2010.
Office Action from Corresponding U.S. Appl. No. 11/555,026 dated Mar. 8, 2010.
Office Action from Corresponding U.S. Appl. No. 11/555,043 dated Mar. 17, 2010.
Office Action from Corresponding U.S. Appl. No. 11/959,749 dated Mar. 31, 2010.
Office Action from Corresponding U.S. Appl. No. 11/617,426 dated Apr. 16, 2009.
Office Action from Corresponding U.S. Appl. No. 11/617,426 dated Nov. 17, 2008.
Office Action from Corresponding U.S. Appl. No. 11/617,395 dated Aug. 3, 2010.
Office Action from Corresponding U.S. Appl. No. 11/617,395 dated Nov. 24, 2010.
Office Action from Corresponding U.S. Appl. No. 11/555,043 dated Aug. 4, 2010.
Office Action from Corresponding U.S. Appl. No. 11/555,026 dated Aug. 3, 2010.
Office Action from Corresponding U.S. Appl. No. 11/959,749 dated Sep. 15, 2010.
Office Action from Corresponding U.S. Appl. No. 11/952,474 dated Aug. 27, 2010.

* cited by examiner

SYSTEM AND METHOD FOR UNDERWRITING A PREPACKAGED BUSINESS OWNERS INSURANCE POLICY

CROSS-REFERENCE TO RELATED APPLICATIONS

This application claims the benefit of U.S. Provisional Patent Application Ser. No. 60/828,593 entitled, "System and Method for Underwriting a Prepackaged Business Owners Insurance Policy," filed Oct. 6, 2006, the contents of which are hereby incorporated herein by reference in their entirety.

FIELD OF THE INVENTION

The present invention relates to providing a prepackaged insurance product, and more particularly relates to a providing a business owners policy (BOP) with up-front pricing for micro businesses.

BACKGROUND OF THE INVENTION

Insurance carriers typically underwrite BOPs based on a process as shown in FIG. 1 to cover a business owner's real estate (if the business owner is the real property owner), personal property contents (whether owning or renting the premises) and general liability. The limits and premiums typically vary depending upon the carrier's underwriting model. Disadvantages of this approach include the customer having to walk through an application process to reach the price, which may be inefficient for the customer. The offering may be beyond the customer's needs, and the offering or the process difficult to understand.

A target market for property and casualty carriers is small ("micro") businesses with 0-1 employees, who may or may not have prior insurance. Professional and personal services (for example hairdressers), consultants, real estate agents, and the like are examples of classes of business in which many micro businesses are found.

SUMMARY OF THE INVENTION

Addressing the above problems in prior approaches, the system and process of the invention effectively invert and simplify the current process of underwriting BOP by starting with a final price, omitting application of underwriting models to provide risk profiles and a premium based on a customer's individual data, screening for eligibility, and issuing the policy.

Generally described, one embodiment of the invention provides a system for insuring a party, comprising a database containing, for an insurance product, predetermined coverages, predetermined limits, and a fixed premium amount, and containing, for one or more categories of insureds, characteristics of members of the category; a user computing device configured to provide to a carrier automated system information relating to an applicant and a request for a determination whether the applicant is a member of one or more of the categories of insureds in the database eligible for the insurance product; wherein the carrier automated system is configured to receive the information and the request from the user computing device, to compare the information provided relating to the applicant with category characteristics from the database for determining whether the applicant is a member of one or more of the categories of insureds in the database eligible for the insurance product, and to provide a response to the user computing device based on the determination of eligibility, and if the applicant is eligible, the response providing an offer to bind the applicant to the insurance product; and a network allowing the user computing device to access the carrier automated system and allowing the carrier automated system to access the database.

The characteristics of members of a category in the database may, in one embodiment, not include a risk level to be met by an applicant individually. The coverages may include liability coverage.

The carrier automated system may be further configured in an embodiment of the invention to communicate over the network with one or more third party information sources to seek verification of information provided relating to the applicant. The carrier automated system may seek the verification of information at a time selected from prior to providing an offer to bind the applicant to insurance or subsequent to providing an offer to bind the applicant to insurance.

In an embodiment of the invention, the network comprises the Internet, and the carrier automated system comprises a carrier server operating a website.

In an embodiment of the invention, the user computing device may be associated with an agent representing the applicant. Alternatively, the user computing device may be associated with the applicant.

In an embodiment of the invention, the coverages comprise business owners insurance, and the characteristics of a member category include (separately or in combination): business classification, sales volume, number of employees, payroll amount, credit score, or premises size.

According to another embodiment, the invention provides a method for insuring a party, comprising providing a database containing, for an insurance product, predetermined coverages, predetermined limits, and a fixed premium amount, and containing, for one or more categories of insureds, characteristics of members of the category; sending from a user computing device to a carrier automated system over a network information relating to an applicant and a request for a determination whether the applicant is a member of one or more of the categories of insureds in the database eligible for the insurance product; receiving at the carrier automated system the information and the request from the user computing device; comparing at the carrier automated system the information provided relating to the applicant with category characteristics from the database to determine whether the applicant is a member of one or more of the categories of insureds in the database eligible for the insurance product; and providing a response from the carrier automated system to the user computing device based on the determination of eligibility, and if the applicant is eligible, the response including an offer to bind the applicant to the insurance product.

According to another embodiment, the invention provides a storage device having stored thereon instructions executable by a computer for providing a fixed price for predetermined coverages and coverage limits associated with a category of insureds; screening information received relating to a customer to determine whether the customer has predetermined characteristics making the customer eligible for the policy, the predetermined characteristics not including a risk level; and issuing insurance for the predetermined coverages and coverage limits at the fixed price if the customer is eligible.

According to another embodiment, the invention provides a system for insuring a party, comprising: a database containing, for an insurance product, predetermined coverages, predetermined limits, and a fixed premium amount, and containing, for one or more categories of insureds, characteristics of members of the category; a carrier automated system having access to the database and being configured to receive information relating to an applicant and a request for a determination whether the applicant is a member of one or more of the categories of insureds in the database eligible for the insurance product, to compare the information provided relating to the applicant with category characteristics from the database for determining whether the applicant is a member of one or more of the categories of insureds in the database eligible for the insurance product, and if the applicant is eligible, providing an offer to bind the applicant to the insurance product.

From the customer's point of view, the invention eliminates unknown factors (for example by providing an up front price rather than making the customer walk through an application process to reach the price), provides a well-defined product that is easy to understand, and provides a more efficient process.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The present invention departs from current underwriting practice by providing a prepackaged insurance product based on class or category of customer, with pre-set coverages and pre-set policy limits, based on qualifying the customer and issuing a policy. It applies readily to a BOP product based on class or category of business, such as micro businesses as described above; but the concept can be expanded to include larger businesses or other customers.

Figure 1:
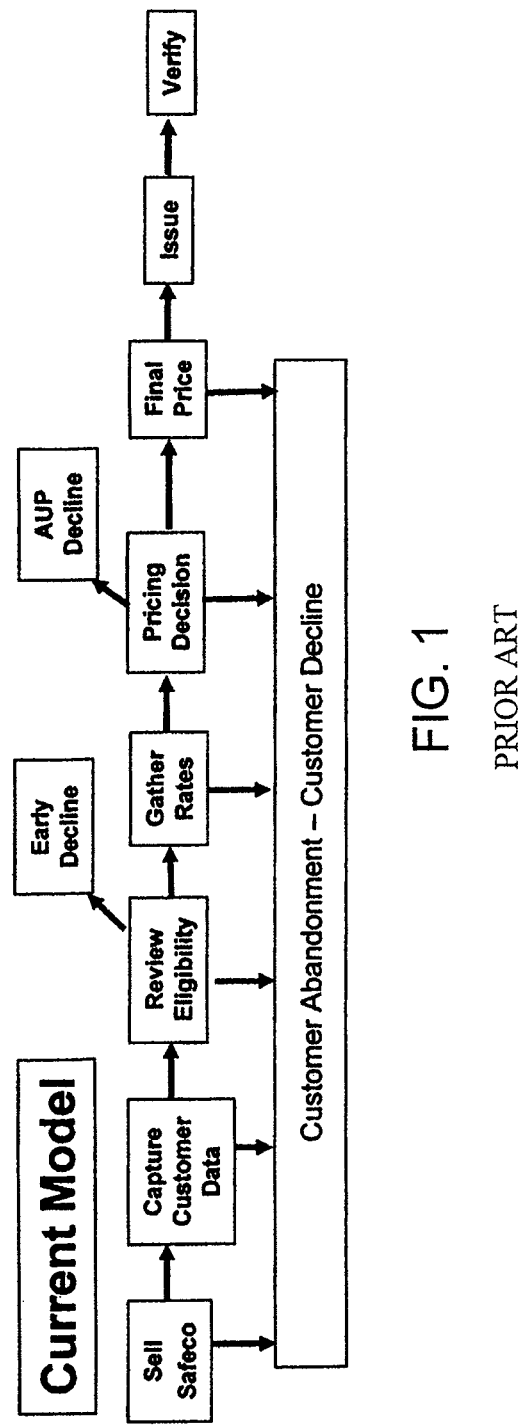
FIG. 1 is a flow diagram of a prior art system and process for underwriting business owner insurance policies.
Figure 2:
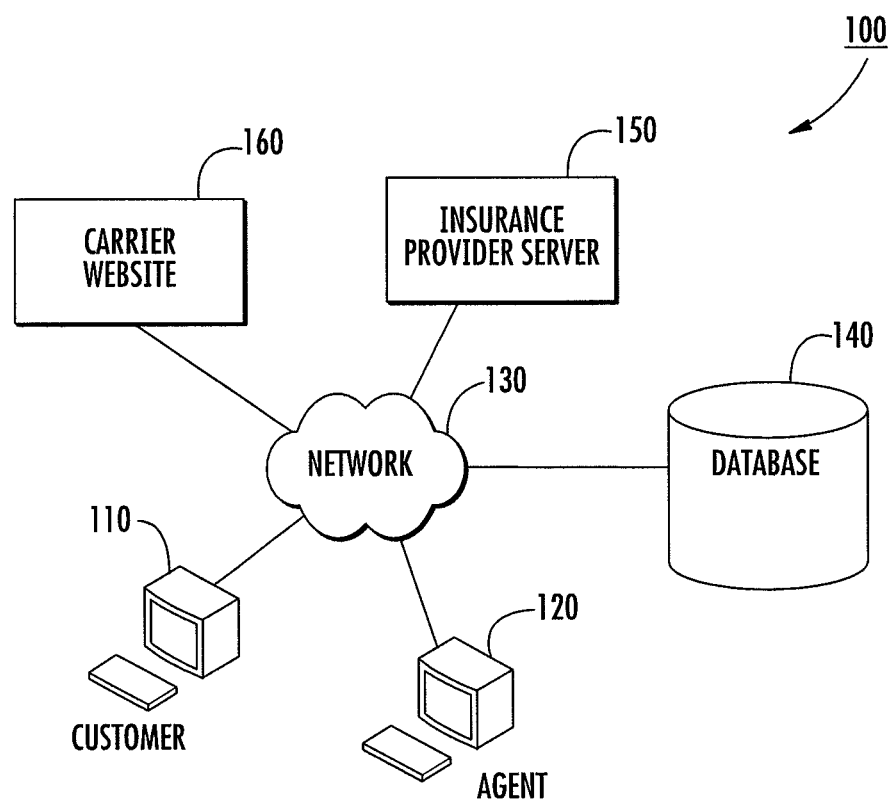
FIG. 2 is a schematic diagram showing a system for providing various aspects of a system for providing insurance according to an embodiment of the present invention.

Aspects of the present invention may be implemented in a system as shown in FIG. 2. As may be understood from this figure, the system 100 may include one or more computing devices 110, 120, which may be used, for example by a customer or an advisor, such as an independent insurance agent, to access a carrier automated system. The carrier automated system may include a carrier website 160 via a network 130 (e.g., a Local Area Network (LAN), wide area network (WAN), the Internet, or the like) for the purpose of requesting a determination of eligibility. Either or both computing device 110, 120 may include, for example, a personal computer (PC), laptop, personal digital assistant (PDA), cellular telephone, or similar electronic device. According to one exemplary embodiment, the carrier website 160 may be operated by carrier system server 150 by way of the same or a different network 130. In particular, as discussed in more detail below, a component of the carrier automated system, for example a carrier system server 150 in one exemplary embodiment, may be configured to execute a computer software program to determine eligibility of a customer in the manner described below.

The system may further include a database 140 accessible by a component of the carrier automated system such as the insurance provider server 150 for the purpose of obtaining information needed to determine eligibility of a customer to obtain a prepackaged BOP or other policy as described below.

Figure 3:
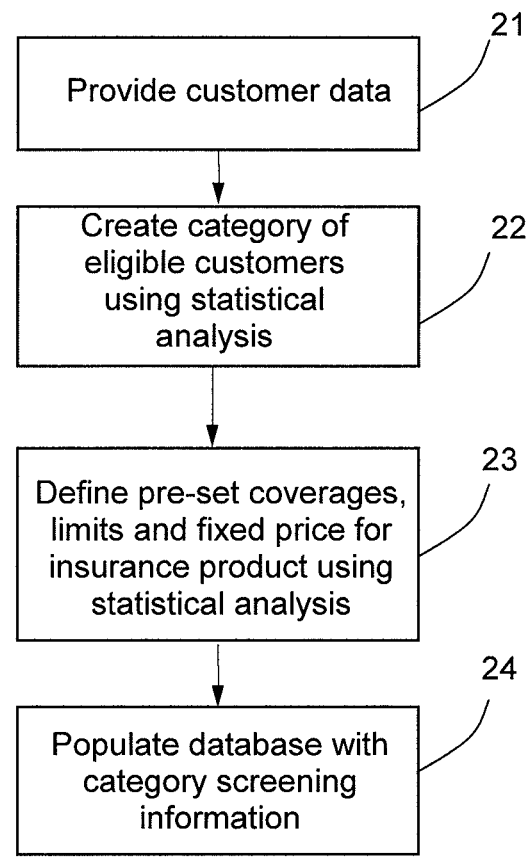
FIG. 3 is a flow diagram of a system and process for prepackaging an insurance product according to an embodiment of the present invention.

FIG. 3 shows a process for prepackaging an insurance product according to an embodiment of the present invention for use with a system embodying the invention. At step 21, existing data for similar customers is provided. At step 22, statistical analysis is used to calculate model profiles using the existing data on similar customers to create categories of businesses which do or do not meet qualifications for the prepackaged BOP product. At step 23, similar statistical analysis is utilized on the customer data to define the pre-set coverages and limits that will be offered for a competitive and profitable fixed price. Coinsurance may be specified. The policy is priced at a flat premium using the carrier's current underwriting models, for all businesses that meet the screening criteria. This pre-marketing analysis eliminates the need for segmentation based on individual application data for the prepackaged BOP product. At step 24, the database 140 is populated with the category information needed to determine eligibility of a customer to obtain the prepackaged insurance product.

Figure 4:
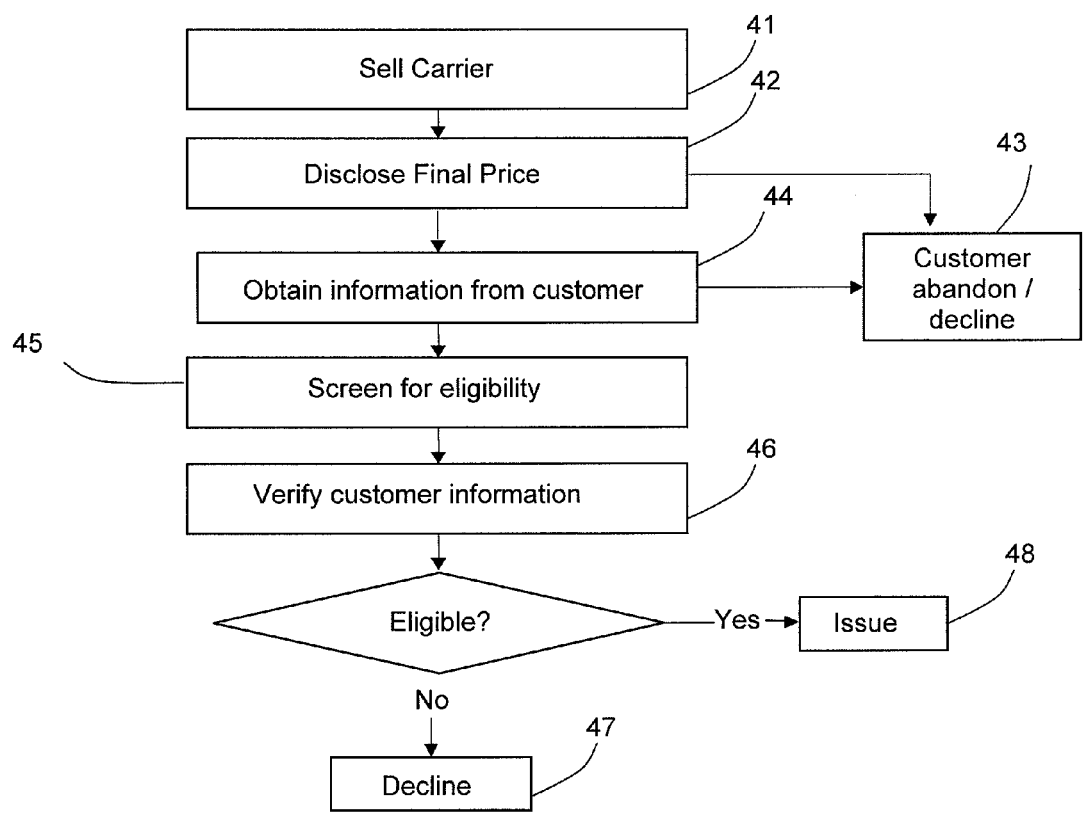
FIG. 4 is a flow diagram of a system and process for processing a request for insurance according to an embodiment of the present invention.

FIG. 4 shows a process of binding an insurance product, such as a BOP, according to an embodiment of the invention. The prepackaged insurance product may be distributed through an agency channel or directly to customers via online or other known methods. At steps 41 and 42, a carrier's marketing effort is directed to sell a prospective customer on the carrier and the fixed price advantage of the insurance product. At step 43, the prospect may decline to proceed. At step 44, the customer is asked a minimum number of questions (for example, 10 questions), which vary depending on the class of business, to qualify the customer and determine risk acceptability. This process reduces the abandonment rate, but the customer may abandon at this point. At step 45, the carrier automated systems compare the data to the model profiles and receive back in real time an indication whether the customer falls into a category eligible for the insurance product.

Referring again to steps 42 through 45, when using an agency marketing channel, the agent is able to tell the customer the fixed price up front, obtains responses to the required questions, and accesses carrier automated systems to submit the data.

Preferably, at this point in the process when eligibility is being determined, at step 46, in real time, internal carrier or outside data sources are accessed to verify the data on which eligibility was based. At step 47 if the customer fails the eligibility screening or verification, coverage is declined. At step 48, if the customer passes the eligibility screening and verification, the policy is issued. Alternatively, if verification is not done in real time during the process, it may be done subsequent to issuance, and the continuance of the policy may be made dependent on verification of the data provided.

In a direct customer version, such as the case of distribution online, the customer provides the answers to the required questions using the customer computing device 110, and receives either a refusal or issuance of the insurance product.

Customer support is provided efficiently at minimized expense via self service support via an online support web site or a call center.

Examples of criteria that may be used for eligibility screening in step 45 include, alone or in combination:
a. Business classification;
b. Sales volume;
c. Number of employees
d. Payroll amount;
e. Credit score;
f. Premises square footage.

The verification step 46 seeks to corroborate information received from the customer related to the eligibility criteria. For example, sources such as Dun & Bradstreet may provide name verification and confirm the provided class of business. In a more specific example, sources might verify that the customer has a Federal Employer Identification Number (FEIN) that is associated with a business within the customer-provided class of business. The customer may be linked to a tradename (DBA) confirmed to be located at the provided address in premises having the provided square footage. Risk of fraud may be reduced by the use of contractual provisions known in the industry.

As an example of a prepackaged BOP as the insurance product of the present invention, a real estate agent might acquire a BOP for a $500 premium with $25,000 in building and personal property coverage and $1 million in general liability coverage. In one embodiment, a BOP according to the invention omits real property coverage when necessary to enable the carrier to offer a fixed fee and maintain profitability. Business personal property coverage might be up to $50,000 (with a deductible such as $250), and business liability up to $500,000/1,000,000.

A BOP according to the invention is efficient for the agent to write and service, and provides a clearly defined market, cross selling opportunities, and opportunities to expand the agent's market. From the carrier's point of view, the customer has fewer opportunities and incentives to say no to the policy, and abandonment rates are lower. The carrier may capture an untapped market and grow with a profitable product. The risk that the prepackaged insurance product will not fit a particular member of the category may be mitigated by careful specification of limits, pre-renewal screening, a premium audit, and/or converting the policyholder to a different policy.

The present invention may be applied to provide insurance coverage to customers in need of insurance other than business owners.

What is claimed is:

1. A computer system for insuring a business owner, comprising:
a database containing acceptable profile values for characteristics of micro business insurance customers, a fixed price, and predetermined coverages and coverage limits for a business owner's policy; and
one or more computer systems having access to the database and being configured to execute computer software:
to the calculate acceptable profile values for characteristics of micro business insurance customers based on data for existing customers in similar micro businesses, and set the fixed price and predetermined coverages and coverage limits for the business owner's policy based on said data, the characteristics selected from a combination of two or more of: micro business classification, payroll amount, credit score, or premises size;
to store the acceptable profile values, fixed price and predetermined coverages and coverage limits for the business owner's policy in the database;
to receive, over a network from a computing device of a micro business party, application information from the business party describing aspects of the party's business related to the selected characteristics;
to compare the application information received from the party to the profile values; and
in response to the party having acceptable values for the characteristics, offering the party the business owner's insurance policy having the predetermined coverages and coverage limits at the fixed price without further risk analysis of the party.

2. The system of claim 1, wherein the coverages include liability coverage.

3. The system of claim 1, wherein the one or more computer systems are further configured to execute computer software to communicate over the network with one or more third party information sources to seek verification of information provided relating to the applicant party.

4. The system of claim 3, wherein the one or more computer systems seek the verification of information at a time selected from prior to providing an offer to bind the party to insurance or subsequent to providing an offer to bind the party to insurance.

5. The system of claim 4, wherein the network comprises the Internet, and wherein the one or more computer systems comprise a carrier server operating a website.

6. The system of claim 1, wherein the user party computing device is associated with an agent representing the applicant party.

7. The system of claim 1, wherein the party computing device is associated with the party.

8. The system of claim 1, wherein the network comprises the Internet, and wherein the one or more computer systems comprise a carrier server operating a website.

9. A method for providing a prepackaged business owners insurance policy, comprising:
calculating acceptable profile values for characteristics of micro business insurance customers based on data for existing customers in similar micro businesses, and setting a fixed price and predetermined coverages and coverage limits for a business owner's policy based on said data, the characteristics selected from a combination of two or more of: micro business classification, payroll amount, credit score, or premises size;
receiving application information from a micro business party describing aspects of the party's business related to the selected characteristics;
comparing the application information received from the party to the profile values; and
in response to the party having acceptable values for the characteristics, offering the party the business owner's insurance policy having the predetermined coverages and coverage limits at the fixed price without further risk analysis of the party.

10. The method of claim 9, wherein the characteristics are: micro business classification, payroll amount, credit score, and premises size.

11. A method for providing a prepackaged business owners insurance policy, comprising:
calculating acceptable profile values for characteristics of micro business insurance customers based on data for existing customers in similar micro businesses, and setting a fixed price and predetermined coverages and coverage limits for a business owner's policy based on said data, the characteristics selected from a combination of two or more of: micro business classification, payroll amount, credit score, and premises size;

receiving application information from a business party describing aspects of the party's business related to the selected characteristics;

comparing the application information received from the party to the profile values;

in response to the party having acceptable values for the characteristics; verifying the truth of the application information; and in response to successful verification of the application information, offering the party the business owner's insurance policy having the predetermined coverages and coverage limits at the fixed price without further risk analysis of the party.

\* \* \* \* \*

UNITED STATES PATENT AND TRADEMARK OFFICE
CERTIFICATE OF CORRECTION

| | | |
|---|---|---|
| PATENT NO. | : 8,589,190 B1 | Page 1 of 1 |
| APPLICATION NO. | : 11/867865 | |
| DATED | : November 19, 2013 | |
| INVENTOR(S) | : Pugh et al. | |

It is certified that error appears in the above-identified patent and that said Letters Patent is hereby corrected as shown below:

In the claims:

Column 6,
Claim 3, Line 21, "the applicant party." should read --the party.--;
Claim 6, Line 30, "the user party" should read --the party--;
Claim 6, Line 31, "representing the applicant" should read --representing the--.

Signed and Sealed this
Eleventh Day of March, 2014

Michelle K. Lee
*Deputy Director of the United States Patent and Trademark Office*